United States Patent [19]
Walters et al.

[11] Patent Number: 5,980,964
[45] Date of Patent: Nov. 9, 1999

[54] EXTRACTION OF OIL FROM OIL BEARING PRODUCTS WITH A CHILLED LIQUEFIED NORMALLY GASEOUS SOLVENT

[75] Inventors: Alan Walters, Thornton; Justin Dodds, Arvada, both of Colo.

[73] Assignee: Gilroy Foods, d/b/a/ConAgra Corporation, Arvada, Colo.

[21] Appl. No.: 09/099,540

[22] Filed: Jun. 18, 1998

[51] Int. Cl.⁶ .................................................. A23D 9/00
[52] U.S. Cl. ......................... 426/417; 426/425; 426/429; 426/474; 426/489; 426/524; 554/8; 554/11; 554/12
[58] Field of Search ................................. 426/417, 425, 426/429, 474, 489, 524

[56] References Cited

U.S. PATENT DOCUMENTS

| | | |
|---|---|---|
| 1,802,533 | 4/1931 | Reid . |
| 2,152,664 | 4/1939 | Rosenthal . |
| 2,254,245 | 9/1941 | Rosenthal . |
| 2,564,409 | 8/1951 | Rubin . |
| 3,846,572 | 11/1974 | Nonaka ................................... 426/524 |
| 4,069,351 | 1/1978 | Yano ....................................... 426/386 |
| 4,331,695 | 5/1982 | Zosel . |
| 5,041,245 | 8/1991 | Benado . |
| 5,281,732 | 1/1994 | Franke . |
| 5,405,633 | 4/1995 | Heidlas et al. . |
| 5,516,923 | 5/1996 | Hebert et al. . |
| 5,525,746 | 6/1996 | Franke ..................................... 426/417 |
| 5,707,673 | 1/1998 | Prevost et al. . |
| 5,728,851 | 3/1998 | Franke ..................................... 426/417 |
| 5,739,364 | 4/1998 | Franke . |

*Primary Examiner*—Carolyn Paden
*Attorney, Agent, or Firm*—Swanson & Bratschun LLC

[57] ABSTRACT

A method of extracting from an oil bearing product at below a select temperature. The method includes providing an oil bearing product at a temperature at or below the select temperature. A liquid extraction solvent that is a gas under standard temperature and pressure is provided, with the extraction solvent being maintained at a temperature below its boiling point at ambient pressure and below the select temperature and at substantially ambient pressure. The oil bearing product is contacted with the extraction solvent at ambient pressure for a period sufficient to extract a select amount of the oil from the oil bearing product resulting in a reduced oil content product and an oil bearing extraction solvent. Residual extraction solvent is removed from the reduced oil content product at a removal pressure sufficiently below standard atmospheric pressure that the boiling point of the extraction solvent is below the select temperature and at a temperature between the boiling point of the extraction solvent at the removal pressure and the select temperature.

15 Claims, 4 Drawing Sheets

EXTRACTION OF OIL FROM OIL BEARING PRODUCTS WITH A CHILLED LIQUEFIED NORMALLY GASEOUS SOLVENT

BACKGROUND OF THE INVENTION

1. Technical Field

The present invention is directed toward a method of extracting oil from an oil bearing product and more particularly toward a method of extracting oil from an oil bearing product with a chilled liquefied normally gaseous hydrocarbon solvent at ambient pressures.

2. Background Art

Use of hydrocarbon solvents for removing fats and oils from various oil bearing products has been in use for many years. Hexane is one hydrocarbon solvent that has been used extensively. Hexane has the advantage of being in a liquid state under most ambient temperatures and pressures. As a result, extractions can be done without pressure resistant vessels at room or slightly elevated temperatures, which facilitates continuous and high volume extraction processes. However, hexane extraction is not without serious shortcomings. Hexane is a toxic material and may only be present in small concentrations in reduced oil content products or extracted oils for such products and oils to be safe for human or animal consumption. However, because of its relatively high boiling point (69° C. at standard pressure), it is difficult to remove residual hexane from reduced oil content products and extracted oils. Hexane removal is typically accomplished by distillation, thermal flashing or stripping techniques. The relatively high boiling point of hexane means it has a relatively low volatility, approaching that of the extracted oil. The relatively close volatilities and the strong affinity between hexane and extracted oil or reduced oil content products requires relatively high temperatures and severe stripping conditions to strip residual hexane. These high temperatures and severe conditions can degrade and impair important quality characteristics such as color, taste and digestibility of both the extracted oils and the reduced oil content products and thus reduce their economic value. Moreover, even when using high temperatures and severe stripping conditions, it often is not possible to reduce hexane concentrations in a product to acceptably safe, low levels. Moreover, the separated hexane presents an air pollution hazzard which must be carefully controlled and monitored.

As an alternative, use of normally gaseous hydrocarbons under temperatures and pressures to maintain the solvents in a liquid state is known in the art. Illustrative prior art patents include Prevost, U.S. Pat. No. 5,707,673; Franke, U.S. Pat. No. 5,525,746; Hebert, U.S. Pat. No. 5,516,923; Benado, U.S. Pat. No. 5,041,245; Rosenthal, U.S. Pat. No. 2,254,245; and Reid, U.S. Pat. No. 1,802,533.

These normally gaseous hydrocarbon solvents, typically propane or butane, can be more easily separated from extracted oils and reduced oil content products than hexane, primarily because of the relatively greater difference in volatility between these normally gaseous hydrocarbon solvents and the extracted oils and reduced oil content products. While it is well known that decreasing the temperature or increasing the pressure of a normally gaseous hydrocarbon solvent can produce a liquid state, the prior art favors conducting the extractions at elevated temperatures and therefore elevated pressures. Elevated temperatures are preferred to increase the oil solubility and therefore the extraction efficiency. The prior art also teaches that conducting the extraction at elevated temperatures and pressures facilitates separation of the solvent from the extracted oil and reduced oil content products after oil extraction. However, the increased extraction pressure increases capital equipment and energy costs. Moreover, the explosive characteristics of the vapors subject to escape from such pressurized extraction vessels raises significant safety issues. Finally, the need to maintain high pressures in the extractions vessels renders continuous extraction processes very difficult and expensive to construct and maintain.

Even with the relative ease of separating normally gaseous hydrocarbon solvents from extracted oils and reduced oil content products, the prior art does not teach a suitable method for reducing the oil content of products that must maintained at low temperatures, such as frozen fried foods. Prior art methods of flashing the solvent from a reduced content oil bearing product can lead to defrosting and harm to such a product.

The present invention is intended to overcome one or more of the problems discussed above.

SUMMARY OF THE INVENTION

A first aspect of the present invention is a method of extracting oil from an oil bearing product at below a select temperature. The method includes providing an oil bearing product at a temperature at or below the select temperature. A liquid extraction solvent that is a gas under standard temperature and pressure is provided, with the extraction solvent being maintained at a temperature below its boiling point at ambient pressure and below the select temperature and at substantially ambient pressure. The oil bearing product is contacted with the extraction solvent at ambient pressure for a period sufficient to extract a select amount of the oil from the oil bearing product, resulting in a reduced oil content product and an oil bearing extraction solvent. Residual extraction solvent is removed from the reduced oil content product at a removal pressure sufficiently below standard atmospheric pressure that the boiling point of the extraction solvent is below the select temperature and at a temperature between the boiling point of the extraction solvent at the removal pressure and the select temperature. The extraction solvent is preferably butane.

A particularly advantageous application of the method is the extraction of oil from an oil bearing product that is frozen. In this application, the select temperature is at or below a temperature to maintain the product frozen. The frozen oil bearing product may be a fried food, such as fried potato in a variety of forms such as hash browns or french fries or other frozen fried foods such as cheese sticks or vegetables.

In a highly preferred embodiment of the first aspect of the invention, the oil bearing product is contacted with the extraction solvent in first and second sequential stages. In the first stage a first oil extraction of the oil bearing product is conducted with solvent recovered from the second stage extraction. At the second stage a second oil extraction from the reduced oil content product is conducted with a substantially oil free solvent. The oil bearing extraction solvent from the second stage is then subject to separation of the oil from the oil bearing extraction solvent and the de-oiled extraction solvent is recycled to the second stage of the extraction.

The method of extracting oil from an oil bearing product with a chilled liquefied normally gaseous hydrocarbon solvent of the present invention is particularly advantageous for the extraction of oil from frozen oil bearing products. The method enables the extraction of oil and the removal of residual extraction solvent from the reduced oil content frozen product to be accomplished at temperatures below the freezing point of the frozen oil bearing product, which protects the integrity of the frozen oil bearing product. Because the extraction is conducted at substantially ambient pressures, there is no need to provide pressurized extraction vessels, thereby decreasing capital equipment and energy costs and facilitating continuous extraction. Indeed, well established, continuous extraction systems developed primarily for hexane extractions (at ambient pressures) are suitable for use. Many of the safety problems of conventional high temperature and high pressure extraction processes are also avoided by conducting the extraction at ambient pressures and low temperatures. Extraction efficiencies which justify commercial application of the cold extraction process are obtained and residual solvent concentrations of the reduced oil content products and extracted oil meet both safety and quality criteria.

DETAILED DESCRIPTION OF THE PREFERRED EMBODIMENT

Figure 1:
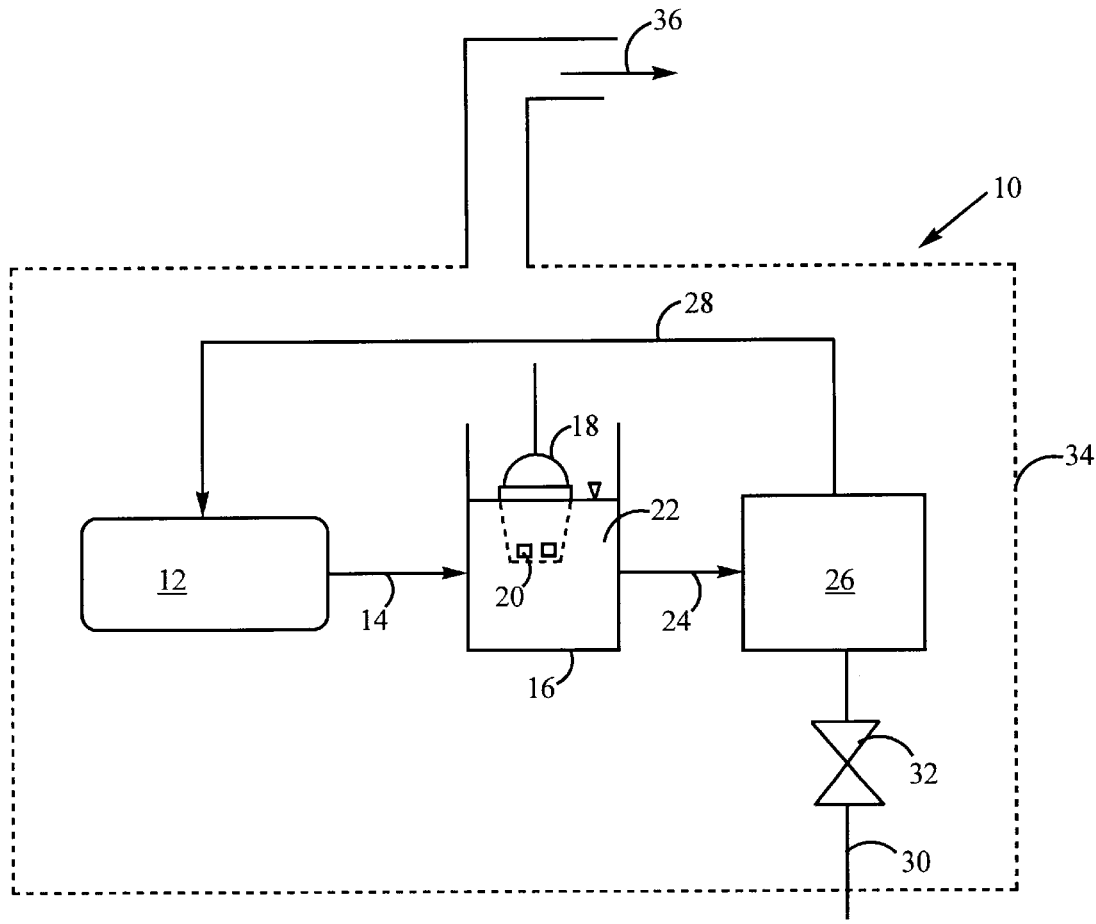
FIG. 1 is a schematic view of a batch cold-temperature ambient pressure extractor in accordance with the present invention.

A batch cold-temperature ambient pressure extractor 10 is illustrated schematically in FIG. 1. The batch extractor 10 consists of a solvent chiller 12 which chills a normally gaseous solvent sufficiently that it exists in a liquid state. Preferably the normally gaseous solvent is a hydrocarbon, more particularly, butane. Liquid solvent is conveyed through conduit 14 to the extraction vessel 16. The extraction vessel 16 is chilled by wrapped chilling coils, an internal chilling coil, external chill jacket or the like and insulated so as to maintain the interior of the extraction vessel 16 below the boiling point of the liquid butane at ambient pressure. A sieve 18 contains an oil bearing product which is subject to extraction within the extraction vessel 16. The sieve is readily inserted and removed from the extraction vessel 16. As illustrated, the oil bearing product 20 is immersed within liquid butane 22 contained in the extraction vessel 16. Extraction efficiency can be improved by circulating the liquid butane within the extraction vessel by an impeller or the like (not shown) or agitating or rotating the sieve 18 either manually or by a suitable mechanism (not shown). Oil bearing extraction solvent from the extraction vessel 16 flows through conduit 24 to an oil/solvent separator 26. The oil/solvent separator 26 can be, for example, a still within which solvent is distilled in one or more stages or evaporated and separated from the oil with the vaporized solvent being recycled through conduit 28 back to the chiller 12. The oil from which substantially all the solvent has been distilled is recovered for recycling or disposal through conduit 30 controlled by valve 32. The chiller 12, extraction vessel 16 and the oil/solvent separator 26 as well as the various conduits are contained within a ventilation hood 34 which continuously ventilates any escaping butane gas to the atmosphere, as illustrated by the arrow 36.

In one preferred embodiment, the ventilation hood 34 is insulated and maintained at a chilled temperature at or below the boiling point of the liquid butane at the ambient pressure. This eliminates a need to insulate the conduits and insulate and chill the extraction vessel 16.

Figure 2:
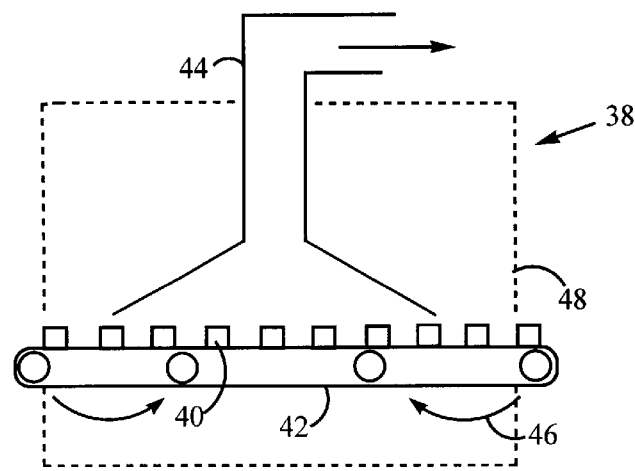
FIG. 2 is a schematic illustration of an apparatus for removing residual extraction solvent from a reduced oil content product.

FIG. 2 is a schematic illustration of an apparatus 38 for removing residual extraction solvent from a reduced oil content product 40. The removal apparatus 38 consists of a conveyer 42 which conveys reduced oil content product 40 under a ventilation hood 44. The ventilation hood 44 creates a slight vacuum and an air flow illustrated by the arrows 46 over the reduced oil content product 40 that helps vaporize residual extraction solvent from the reduced oil content product. The removal apparatus 38 further includes a chamber 48 which encompasses the conveyer 42 and hood 44. The chamber 48 defines a volume which can be maintained at a pressure below the ambient pressure. The chamber 48 is also preferably insulated and subject to temperature controls so that the temperature within the chamber can be maintained at a select temperature for reasons that will be discussed further below with regard to the operation of the batch apparatus.

In use, a normally gaseous hydrocarbon solvent such as butane is cooled by the chiller 12 to below its boiling point at ambient pressure to provide liquid butane 22 within the extraction vessel 16. An oil bearing product 20 is immersed in the liquid butane 22 and maintained in contact for a period of time will result in extraction of a predetermined or select amount of oil. Of course, if too much oil still remains in the oil bearing product 20 after a first extraction, it may be subjected to one or more additional extraction cycles or the extraction time extended so as to remove the desired amount of oil. After the select period, reduced oil content product 40 is subject to solvent removal in the removal apparatus 40. There air is blown over the reduced oil content product 38 to strip residual solvent such that following separation residual solvent is present in sufficiently low amounts that no adverse health effects will result from animal or human consumption of the reduced oil content product 40 and the solvent will not appreciably effect the taste or smell of the reduced oil content product 40.

One preferred application of the batch cold-temperature ambient pressure extractor is for the extraction of oil from frozen oil bearing products. In such applications, the normally gaseous hydrocarbon solvent 22, preferably butane, is chilled by the chiller 12 and maintained in the extraction vessel 16 at below a select temperature necessary to maintain the frozen oil bearing product in its frozen state, and the oil extraction takes place at this temperature. The frozen oil bearing product is preferably at about the select temperature when it is introduced into the extraction vessel. During removal of residual extraction solvent from the reduced oil content frozen product 40, it is extremely helpful to the removal to provide a temperature in the chamber above the boiling point of the butane but below the freezing temperature of the reduced oil content product. This differential is created by the chamber 48 being at a pressure sufficiently below standard pressure (e.g., one atmosphere) so that the boiling point of the butane is below the freezing point of the reduced oil content product. By then maintaining the temperature in the chamber 48 above the boiling point of the butane but below the freezing point of the reduced oil content product, residual butane can be readily disassociated from the reduced oil content product.

Figure 3:
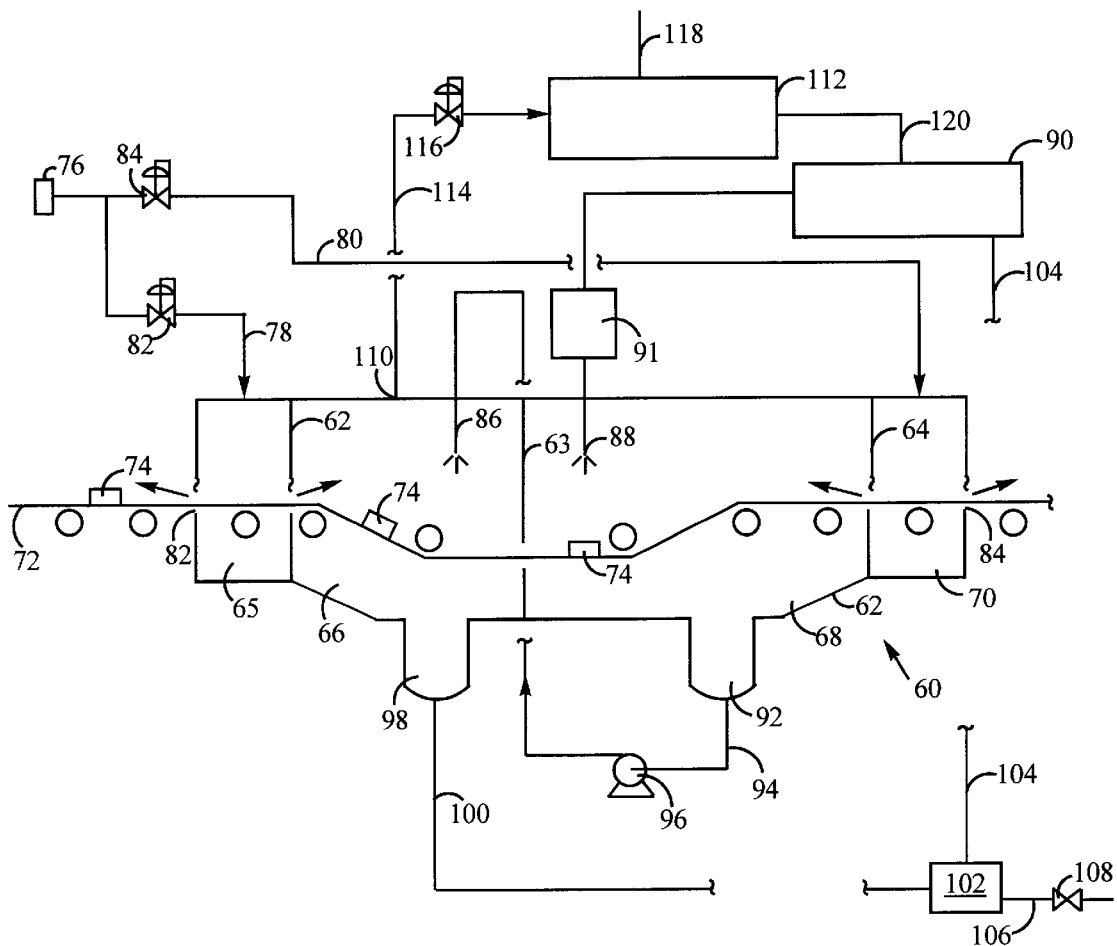
FIG. 3 is a schematic illustration of an apparatus for continuous cold temperature ambient pressure extraction of oil with a chilled liquefied normally gaseous solvent.

FIG. 3 is a schematic illustration of a continuous extractor for performing cold-temperature ambient pressure extractions. The continuous extractor 60 consists of a housing 61 containing a number of partitions 62, 63, 64 defining an inlet pressure lock 65, a first stage extraction vessel 66, a second stage extraction vessel 68 and an outlet pressure lock 70. A conveyer 72 is provided for transporting oil bearing products 74 through the locks and extraction vessels defined within the housing 61. An inert gas supply 76 is in fluid communication via conduits 78, 80 with the inlet pressure lock 65 and the outlet pressure lock 70. Regulators 82, 84 maintain the pressure in the inlet and outlet pressure locks 65, 70 at a level sufficient to prevent ambient air from entering the first stage extraction vessel 66 and the second stage extraction vessels 68 through the inlet 82 and the outlet 84 of the housing 61. The pressure is also sufficient to prevent vapors from the extraction solvent within the first and second stage extraction vessels 66, 68 from exiting the first and second stage extraction vessels and mixing with ambient air. Preferably this pressure is between 0.018–0.036 psia (0.5–1.0 inches of mater).

Within the first stage extraction vessel 66 a normally gaseous hydrocarbon extraction solvent, is exposed to temperatures and pressures sufficient to maintain the extraction solvent in a liquid state is sprayed over the oil bearing product 74 from a nozzle 86. Preferably the pressure is substantially ambient and the temperature is below the solvent boiling point at the ambient pressure. Of course, the pressure locks 65, 70 may maintain the pressure slightly above ambient. In the second stage extraction vessel 68 a partially reduced oil content product 74 is subject to a second contact with the liquid extraction solvent subject to substantially the same temperatures and pressures as in the first extraction vessel 66 emitted through nozzle 88. In the preferred embodiment illustrated in FIG. 3, "fresh" liquid solvent, preferably liquid butane, having substantially no extracted oil content is delivered from an extraction solvent reservoir 90 through a solvent prechiller 91. Oil bearing solvent in the second stage extraction vessel 68 is directed to a trap 92 where it is recovered and conveyed via conduit 94 under a liquid head provided by pump 96 to the nozzle 86. The nozzle 86, as discussed above, delivers the oil bearing solvent collected in the trap 92 of the second stage extraction vessel 68 for contact with the oil bearing product 74. Oil bearing extraction solvent from the first stage extraction vessel 66 is collected in the trap 98 and conveyed through conduit 100 to an oil solvent separator 102 which separates the extraction solvent from the extracted oil by a known process such as distillation, multi-stage evaporation or the like. The vaporized solvent is then recycled to the reservoir 90 which chills the gaseous solvent to a temperature which transforms it to its liquid state under ambient pressure conditions through conduit 104. Alternatively, a condenser (not shown) may be provided in fluid communication with the conduit 104 to condense the vapors prior to introduction into the reservoir 90. Separated oil can be removed from the oil/solvent separator through the conduit 106 controlled by the valve 108.

A vent 110 draws inert gas and solvent vapors from the first and second stage extraction vessels 68, 70 to an inert gas and solvent vapor separator 112 through conduit 114. Regulator 116 maintains the pressure in the conduit 114 and thus the first and second stage extraction vessels at about 0–0.018 psia. Inert gas is vented to the atmosphere or recycled to the supply 76 through exhaust 118 and gaseous solvent is returned to the reservoir 90 through conduit 120.

Reduced oil content product containing residual extraction solvent is then subject to solvent removal at an apparatus for removing extraction solvent from reduced oil content product 40 illustrated in and described above with respect to FIG. 2. Of course, the apparatus for removing extraction solvent could be integral with the continuous extractor 60.

The housing 62 of the continuous extractor 60, may be insulated and cooled to maintain the continuous extractor 60, the extraction solvent and the oil bearing product 74 at a temperature sufficiently low to keep the extraction solvent, preferably butane, at a temperature below its boiling point and therefore in substantially a liquid state. Where the oil bearing product 74 is a frozen product the temperature is preferably below the freezing point of the oil bearing product. Removal of residual extraction solvent from the reduced oil content frozen product is preferably conducted under conditions described above with respect to FIG. 2.

Figure 4:
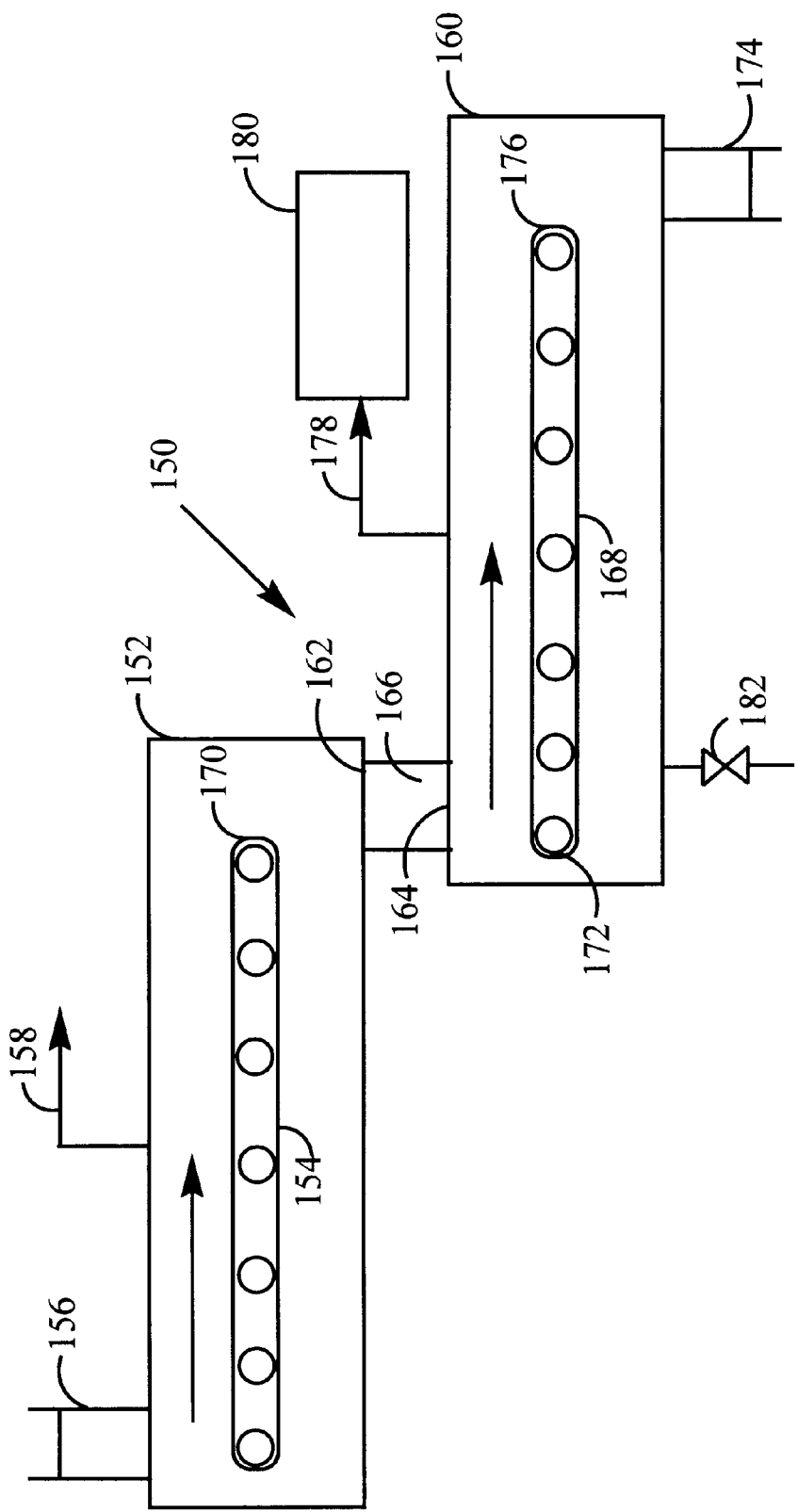
FIG. 4 is a schematic illustration of a two-stage continuous apparatus for removing residual extraction solvent from a reduced oil content product.

FIG. 4 is an alternate embodiment of a two-stage apparatus 150 for removing residual extraction solvent from a reduced oil content product. The two-stage apparatus 150 consists of a first chamber 152 containing a conveyor 154. An inlet vapor lock 156 permits reduced oil content products to enter the first chamber 152 and enables the interior of the first chamber 152 to maintain a slight vacuum. Inside the first chamber 152 the atmosphere is dominated by solvent vapors. The vaporized solvent is drawn off through vent 158 and preferably cycled to vapor recovery wherein the solvent vapor is recondensed and reused for subsequent extractions.

The first chamber 152 is joined to a second chamber 160 wherein the second stage of solvent removal takes place. As depicted in the schematic of FIG. 4, the second chamber 160 lies below the first chamber 152 with the outlet 162 of the first chamber 152 vertically aligned with the inlet 164 of the second chamber 160. An airlock 166 resides between the outlet 162 and the inlet 164. The second chamber 160 contains a second conveyer 168. The back end 170 of the first conveyer 154 is substantially aligned with the front end 172 of the second conveyer so that a reduced oil content product can freely fall from the back end of the first conveyer 170 through the first chamber outlet 162, through the airlock 166, through the inlet 164 to the second chamber and land upon the top of the second conveyer 168. In this manner, reduced oil content products can be subjected to the first and second stage solvent removal in a continuous process. An airlock outlet 174 of the second chamber lies below the back end 176 of the second conveyer 168 so that reduced oil content products are removed by gravity from the second chamber 160. As with the first chamber 152, the second chamber 160 is maintained at a slight vacuum and gasses are vented through vent 178. The gasses vented at 178 have a considerably lower solvent than those vented at 158 and can either be vented to the atmosphere or directed to an air/vapor separator 180. In order to enhance solvent removal, it may be desirable to provide air or an inert gas through a regulator valve at 182.

From the above description, the operation of the two-stage apparatus for removing solvent can be readily understood. Reduced oil content product enters through the inlet vapor lock 156 and falls to the conveyer 154. The reduced oil content product is conveyed along the conveyer to the back end of the conveyer 170 where it falls through the airlock 166 onto the front end 172 of the conveyer 168 within the second chamber 160. Thereafter, the reduced oil content product is conveyed to the back end 176 of the conveyer 168 and drops off the back end through the airlock 174 where it may then be packaged or otherwise further processed. The two-stage removal apparatus enhances solvent vapor recovery opportunities by providing a higher concentration of solvent vapors in the first chamber 152 from which the escaping solvent vapors are vented to vapor recovery at 158. The residual vaporized solvent and air vented from the second chamber 160 through the vent 178 is of considerably lower solvent concentration than what is vented from the first chamber 152 or even a single stage separator as illustrated in FIG. 2 and therefore presents a lesser environmental risk if vented to the atmosphere. The two-stage separation apparatus can readily be deployed in series with the continuous extractor 60.

Figure 5:
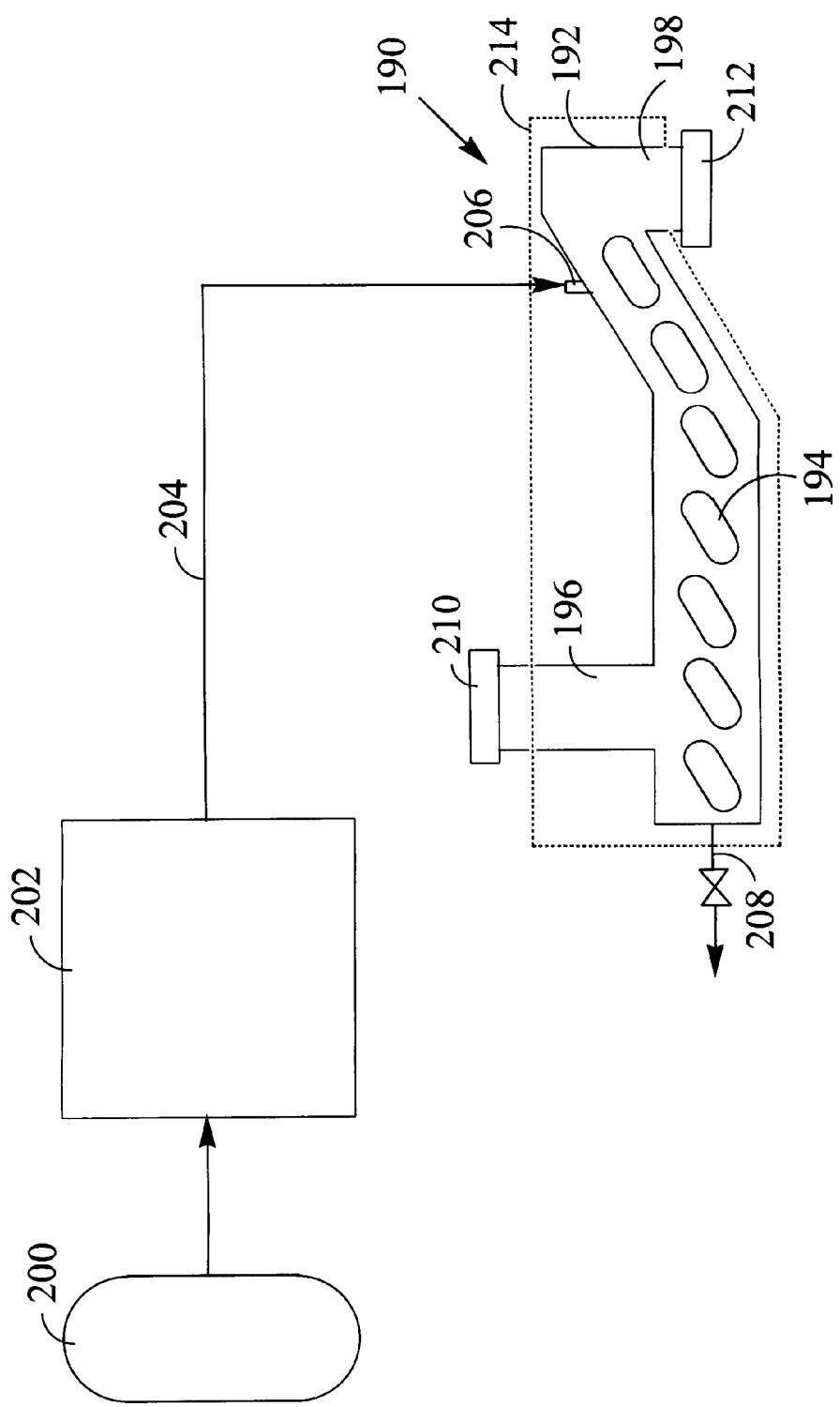
FIG. 5 is a schematic illustration of an alternate embodiment of an apparatus for continuous cold temperature ambient pressure extraction of oil with a chilled liquefied normally gaseous solvent.

FIG. 5 is a schematic illustration of an alternate embodiment of an apparatus 190 for continuous cold temperature ambient pressure extraction of oil with a chilled liquefied normally gaseous solvent. The alternate embodiment 190 illustrated in FIG. 5 schematically represents extractor model no. Mark 4, available from Crown Manufacturing Company of Minneapolis, Minn., modified as described below for continuous extraction using cold butane. Other commercially available extractors could be similarly modified and used with the method of the present invention. The extractor itself consists of a housing 192 containing a conveyer 194 for transporting oil containing products between the housing inlet 196 and the housing outlet 198. Liquid butane from a surge tank 200 is chilled at chiller 202 and delivered through a conduit 204 to the solvent inlet 206. The liquid butane flows between the solvent inlet 206 and the solvent outlet 208 countercurrent to the direction of the conveyer 194 for deboiling the oil containing products. An inlet vapor lock 210 allows oil containing products to be placed in the housing 192 while minimizing the escape of butane vapors. Likewise, a vapor lock 212 at the housing outlet 198 allows reduced oil content products to exit the housing 192 with a minimum amount of exchange between the ambient atmosphere and the interior of the housing 192. The entire housing 192 is contained within an insulated partition 214 and cold air is maintained within the partition 214 to maintain the housing and its contents, including the liquid solvent, at below the boiling point of the liquid solvent. For example, where the liquid solvent is butane, the temperature inside the partition 214 is maintained at about 20° F. where the ambient pressure is about 11.8 psia.

EXAMPLE

Batch oil extractions of Ore-Ida Toaster Hash Browns were conducted using the extractor 10 described in FIG. 1. The ambient pressure at the test facility in Arvada, Colo. ranged around 11.8 psia (24 inches of mercury). At this pressure, the boiling point of pure normal butane is 20° F. By way of contrast, at seal level, pure normal butane boils at 31° F. Extractions were run at temperatures ranging between 5°–20° F. Extraction performance was measured using a drip test. The drip test used a Betty Crocker model BC-1613 toaster. The drip test procedure is as follows:

1. Remove crumb tray and disconnect timer of toaster.
2. Preheat toaster.
3. Tear out a piece of aluminum foil on a gram scale. The piece should be large enough to extend beyond the outside edge of the toaster.
4. Place the foil on the heat-proof tray and center the toaster on top of the foil.
5. Place to patties in the toaster and cook for six minutes using a timer.
6. During the cook off, oil is collected on the foil. After the six minute cook, weigh the foil in grams. Dividing the weight of the oil by two (2) will give the oil drip per patty.

|  | Extraction Time (min) | Extraction Temp. (° F.) | Average Grams of Oil per patty |
| --- | --- | --- | --- |
| Control | N/A | N/A | 0.519 |
|  | 20 | 5.3 | 0.159 |
|  | 20 | 9.3 | 0.09 |
|  | 20 | 12.8 | 0.108 |
|  | 20 | 19.7 | 0.029 |
|  | 10 | 14 | 0.152 |
|  | 20 | 14.3 | 0.088 |
|  | 30 | 13.3 | 0.042 |

Solvent removal (de-gassing) was conducted at 30° F. at 12 psia for 120 minutes. Residual butane levels were reduced from an average of 0.162 (wt) % to an average of 0.006 (wt) %. Removal was conducted essentially as described with respect to FIG. 2, except the samples were cooled in an ice bath and there was no conveyor under the hood.

What is claimed is:

1. A method of extracting oil from an oil bearing product at below a select temperature, the method comprising:

a. providing an oil bearing product at a temperature below a select temperature;

b. providing a liquid extraction solvent that is a gas under standard temperature and pressure, the extraction solvent being maintained at a temperature below its boiling point at ambient pressure and below the select temperature and at substantially ambient pressure;

c. contacting the oil bearing product with the extraction solvent at ambient pressure for a period sufficient to extract a select amount of the oil from the oil bearing product resulting in a reduced oil content product and an oil bearing extraction solvent; and d. removing residual extraction solvent from the reduced oil content product at a removal pressure sufficiently below standard atmospheric pressure that the boiling point of the extraction solvent is below the select temperature and at a temperature between the boiling point of the extraction solvent at the removal pressure and the select temperature.

2. The method of claim 1 wherein the oil bearing product is frozen and the select temperature is at or below a temperature necessary to maintain the product frozen.

3. The method of claim 2 wherein the frozen oil bearing product is a fried food.

4. The method of claim 3 wherein the fried food is potato.

5. The method of claim 1 wherein the extraction solvent is butane.

6. The method of claim 1 wherein in step c. the period is sufficient to reduce the oil content about 80% by weight.

7. The method of claim 1 wherein step d. further comprises flowing air over the reduced oil content product.

8. The method of claim 1 further comprising separating the oil from the oil bearing extraction solvent and recycling the de-oiled extraction solvent to step c.

9. The method of claim 1 wherein the ambient pressure is about 11.8 psia.

10. The method of claim 1 wherein step c. is conducted sequentially in a first and a second stage, wherein in the first stage a first oil extraction of the oil bearing product is conducted with solvent recovered from the second stage extraction and in the second stage a second oil extraction of the reduced oil content product is conducted with a substantially oil-free solvent.

11. The method of claim 1 wherein step a. is conducted sequentially in a first and a second stage, wherein in the first stage a first oil extraction of the frozen oil bearing product is conducted with butane recovered from the second stage extraction, the butane containing oil extracted from the frozen oil bearing product at the second stage, and in the second stage a second oil extraction of the oil containing product is conducted with substantially oil-free butane.

12. A method of extracting oil from a frozen oil bearing product, the method comprising:
   a. at ambient pressure, contacting the frozen oil bearing product with liquid butane maintained at a temperature below its boiling point at ambient pressure for a period sufficient to extract a select amount of oil from the frozen oil bearing product, resulting in a reduced oil content frozen product and an oil bearing liquid butane; and
   b. removing residual butane from the reduced oil content frozen product at a removal pressure and at a removal temperature necessary to temperature being below a temperature necessary to maintain the reduced oil content frozen product frozen and above the boiling point of the butane at the removal pressure.

13. The method of claim 12 wherein the frozen oil bearing product is a frozen food product.

14. The method of claim 12 wherein the frozen oil bearing product is a frozen cooked food product.

15. The method of claim 12 wherein the frozen oil bearing product is a frozen fried food product.

\* \* \* \* \*